United States Patent [19]
Nishio

[11] Patent Number: 6,089,621
[45] Date of Patent: Jul. 18, 2000

[54] PIPE JOINT MADE OF RESIN

[75] Inventor: Kiyoshi Nishio, Sanda, Japan

[73] Assignee: Nippon Pillar Packing Co., Ltd., Osaka, Japan

[21] Appl. No.: 09/175,541

[22] Filed: Oct. 20, 1998

[30] Foreign Application Priority Data

Nov. 10, 1997 [JP] Japan .................................... 9-306983

[51] Int. Cl.[7] .................................................. F16L 25/00
[52] U.S. Cl. ...................... 285/331; 285/334.1; 285/351; 285/354; 285/423; 285/906
[58] Field of Search .................................... 285/353, 354, 285/423, 331, 334.1, 351, 906

[56] References Cited

U.S. PATENT DOCUMENTS 5,154,453  10/1992  Nishio ..................................... 285/423
5,388,871   2/1995  Saitoh ..................................... 285/423

FOREIGN PATENT DOCUMENTS

275749   7/1988   European Pat. Off. ............... 285/423

*Primary Examiner*—Dave W. Arola
*Attorney, Agent, or Firm*—Jones, Tullar & Cooper, P.C.

[57] ABSTRACT

The present invention relates to a pipe joint made of resin used for laying pipes in which a high-purity liquid, ultra pure water or the like flow. According to the pipe joint of the present invention, a sealing surface pressure is generated in both axial and radial directions, providing thereby an excellent sealing property for a long period, and facilitate controlling a torque for fastening a pushing ring. The pipe joint made of resin according to the present invention comprises a joint body having a receiving port, a cylindrical portion, an annular groove portion and a stepped surface. An inner ring forcedly inserted by the pushing ring is provided with an outer projection, an inner projection and an annular recessed portion. On at least one portion among axially opposed portions of each surface, an axial sealing portion is disposed. On at least one portion among radially opposed portions of each surface, an radial sealing portion is disposed. The joint body, the inner ring and the pushing ring are individually made of an optional synthetic resin selected among PFA, PTFE, ETFE, CTFE, and ECTFE.

17 Claims, 8 Drawing Sheets

PIPE JOINT MADE OF RESIN

BACKGROUND OF THE INVENTION

1. Field of the Invention

The present invention relates to a pipe joint made of resin, and in particular, to a pipe joint applied to laying pipes for a high-purity liquid and ultra pure water treated in a production process in various technical fields such as the production of semiconductors, medical supplies and medicines, food processing and the chemical industry.

2. Description of the Prior Art

Figure 8:
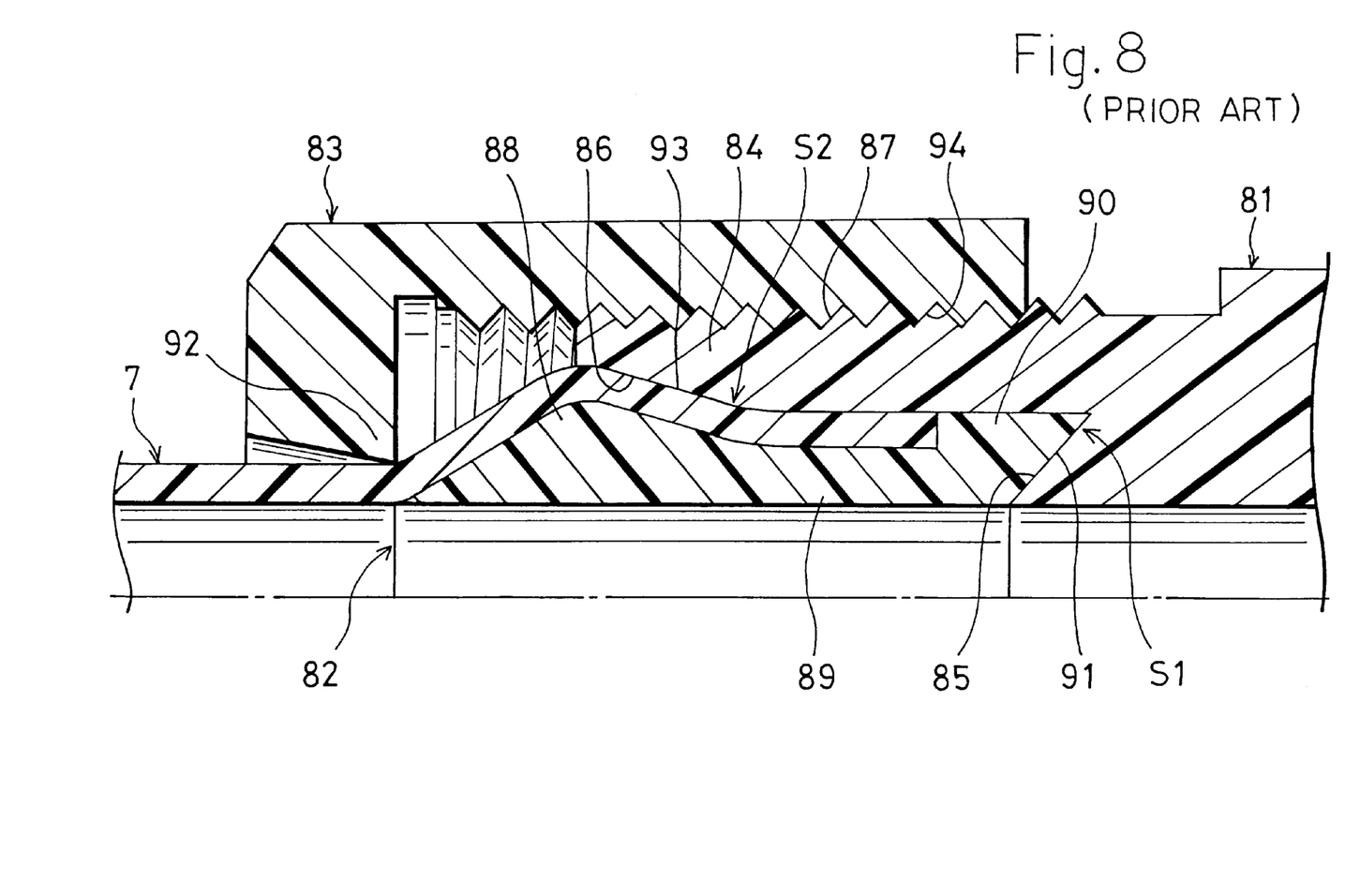
FIG. 8 is a longitudinally sectional side view of a conventional pipe joint made of resin.

Conventionally, such pipe joints made of resin having a structure as shown in FIG. 8 are known. The known pipe joint made of resin comprises a joint body 81, an inner ring 82 and a pushing ring 83. The joint body 81 has a receiving port 84, a tapered receiving surface 85 projecting from a base portion of the receiving port 84, and a tapered receiving surface 86 disposed on a tip portion of the receiving port 84. Additionally, an outer periphery of the receiving port 84 is provided with a male thread portion 87. The inner ring 82 includes a connecting portion 89 having a swelling portion 88 whose section is chevron-shaped, and a protruding portion 90. A tip of the protruding portion 90 is provided with a tapered abutting surface 91. The pushing ring 83 includes a pressing portion 92.

According to this pipe joint made of resin, a diameter of an pipe end 7 made of resin forcedly inserted in the connecting portion 89 is increased, thereby forming a tapered abutting surface 93 on an outer peripheral surface of the pipe 7. The end of the pipe 7 is forcedly inserted into the connecting portion 89, the inner ring 82 connected to the pipe 7 is forcedly inserted in the receiving port 84 of the joint body 81 with the result that a female thread portion 94 of the pushing ring 83 previously fitted in the pipe 7 is threadedly connected to a male thread portion 87 of the receiving port 84, thus being fastened. Then, the pressing portion 92 of the pushing ring 83 pushes the inner ring 82 in a pressing direction, and the abutting surface 91 of the inner ring 82 forcedly abuts against the receiving surface 85 of the joint body 81, thereby forming an axial primary sealing portion Sl, and the abutting surface 93 of the pipe 7 forcedly abuts against the receiving surface 86 of the receiving port 84, thereby forming axial secondary sealing portion S2.

In the conventional pipe joint made of resin referring to FIG. 8, the pushing ring 83 is fastened, thus generating a pressing-directional pressing force. Consequently, a sealing surface pressure in an axial direction is generated on two portions of the primary sealing portion S1 and the secondary sealing portion S2.

In such a pipe joint made of resin, creep and stress relaxation are generated with time on the joint body 81 made of resin and the pushing ring 83, the pipe 7 or the like, whereby the sealing surface pressures of the primary sealing portion S1 and the secondary sealing portion S2 are decreased with the result that there has been a fear that the sealing property will be lost relatively early.

Furthermore, in order to secure a predetermined sealing property, the amount of the threaded connection of the pushing ring 83 is controlled by a fastening torque or the like to high accuracy, and a fastening force generated by the pressing ring 83 has been required to be strictly set at a predetermined magnitude. Therefore, there is a problem wherein operational efficiency is lowered and high technique and skill are required in operation.

SUMMARY OF THE INVENTION

The present invention has been conducted in view of the above mentioned circumstances.

It is an object of the present invention to provide a pipe joint made of resin which enables an early sealing property to be maintained for a long time.

It is another object of the present invention to provide a pipe joint made of resin wherein a radial sealing surface pressure is generated, thereby exhibiting an excellent sealing property regardless of the amount of fastening provided by the pushing ring and the fastening torque, and the sealing property owing to creep and a stress relaxation is not easily deteriorated.

It is still another object of the present invention to provide a pipe joint made of resin wherein neither high technique nor skill is required in the working operation.

A pipe joint made of resin including a joint body, an inner ring, and a pushing ring, an end portion of a pipe material incorporating the inner ring being inserted in an inside of the joint body, the end portion and the inner ring of the pipe material being pressed by the pushing ring threadedly connected to the inside of the joint body, thereby connecting the pipe material to the joint body, comprises:

a cylindrical receiving port disposed on an end portion of the joint body, a cylindrical portion protruding from the joint body to the inside of the receiving port concentrically therewith, thereby having an annular groove between the receiving port and the cylindrical portion, a connecting portion and a protruding portion disposed on a sleeve-shaped inner ring, the inner ring being insertable in the receiving port, the connecting portion being forcedly inserted in an end portion of a pipe made of synthetic resin so as to be connected to the pipe and the protruding portion protruding from the end portion of the pipe when the connecting portion is connected to the end of the pipe, an annular outer projection and an annular inner projection axially protruding from the protruding portion, the annular outer projection being inserted in the annular groove of an outside of the cylindrical portion by inserting the projecting portion of the inner ring in the receiving port, the annular inner projection being inserted in the inside of the cylindrical portion by inserting the projecting portion of the inner ring in the receiving port, an annular recessed portion disposed between the outer projection and the inner projection, and a pressing portion disposed on the pushing ring threadedly connected to the receiving port, for applying a pressing force for pressing the inner ring in a pressing direction, to the inner ring which is connected to the end portion of the pipe and inserted in the receiving port when the pushing ring is threadedly connected to the receiving port.

Therefore, according to the present invention, the connecting portion is forcedly inserted in one end portion of the pipe a protruding portion of the inner ring connected to the pipe is inserted in the receiving port of the joint body, the pushing ring is threadedly connected to the receiving port of the joint body, to be fastened therewith. Consequently, the inner ring is pressed by the pressing portion of the pushing ring in a pressing direction, whereby the cylindrical portion on a side of the joint body is inserted in the annular recessed portion on a side of the inner ring and the inner projection and the outer projection on a side of the inner ring are inserted in the annular groove and the inside of the cylindrical portion.

According to the present invention, preferably, when the pressing force is applied to the inner ring by the pressing portion of the pushing ring, an annular stepped surface disposed on the joint body, protruding from a base portion of the cylindrical portion to an inwardly radial direction, is axially opposed to an end surface of the inner projection, an end surface of the cylindrical portion is axially opposed to a bottom surface of the annular recessed portion and a grooved bottom surface of the annular groove portion is axially opposed to an end surface of the outer projection, with the result that three axially opposed portions are disposed, and the opposed surfaces are overlapped with each other on at least a portion among the axially opposed portions thereby forming an axial sealing portion.

Thus, at least one portion among the three axially opposed portions is provided with an axial sealing portion. The sealing surface pressure generated on the axial sealing portion keeps the sealing property.

According to the present invention, preferably, when the pressing force is applied to the inner ring by the pressing portion of the pushing ring, an inner peripheral surface of the cylindrical portion is radially opposed to an inside surface of the annular recessed portion, an inside surface of the annular groove portion is radially opposed to an inner peripheral surface of the outer projection, and an outside surface of the annular groove portion is radially opposed to an outer surface of the outer projection, with the result that three radially opposed portions are disposed, and the opposed surfaces are overlapped with each other on at least a portion among the radially opposed portions, thereby forming a radial sealing portion.

Thus, at least one portion among the three axially opposed portions is provided with a radial sealing portion. The sealing surface pressure generated on the radial sealing portion keeps the sealing property. The sealing surface pressure generated on the radial sealing portion is generated regardless of an amount of fastening of the pushing ring by a fastening torque.

According to the present invention, preferably, when the pressing force is applied to the inner ring by the pressing portion of the pushing ring, an annular stepped surface disposed on the joint body, protruding from a base portion of the cylindrical portion in an inwardly radial direction, is axially opposed to an end surface of the inner projection, an end surface of the cylindrical portion is axially opposed to a bottom surface of the annular recessed portion and a grooved bottom surface of the annular groove portion is axially opposed to an end surface of the outer projection, with the result that three axially opposed portions are disposed, and the opposed surfaces are overlapped with each other on at least a portion among the axially opposed portions thereby forming an axial sealing portion, and when the pressing force is applied to the inner ring by the pressing portion of the pushing ring, an inner peripheral surface of the cylindrical portion is radially opposed to an inside surface of the annular recessed portion, an inside surface of the annular groove portion is radially opposed to an inner peripheral surface of the outer projection, and an outside surface of the annular groove portion is radially opposed to an outer surface of the outer projection, with the result that three radially opposed portions are disposed, and the opposed surfaces are overlapped with each other on at least a portion among the radially opposed portions, thereby forming a radial sealing portion.

Thus, at least one portion among the three axially opposed portions is provided with an axial sealing portion. The sealing surface pressure generated on the axial sealing portion maintains the sealing property. Moreover, at least one portion among the three radially opposed portions is provided with a radial sealing portion. The sealing surface pressure generated on the radial sealing portion maintains the sealing property. The sealing surface pressure generated on the radial sealing portion is generated regardless of the amount of fastening of the pushing ring and a the fastening torque.

According to the present invention, a bulged portion is annularly disposed on an outer surface of the outer projection, and the outside surface of the annular groove portion may be overlapped with the bulged portion so as to form the radial sealing portion.

Moreover, a number of bulged portions may be axially arranged in line, on the outer surface of the outer projection.

Thus, the sealing surface pressure of the radial sealing portion is concentrated on an overlapping portion wherein the outer surface of the annular groove is overlapped with the bulged portion, thereby exhibiting an excellent sealing property.

According to the present invention, preferably, by the connecting portion of the inner ring, a diameter of the pipe in which the connecting portion is forcedly inserted, is increased, the outer surface of the pipe is provided with a swelling portion whose section is chevron, including a tapered abutting surface whose diameter decreases when proceeding to a tip of the pipe and a tapered receiving surface whose diameter increases when proceeding to a tip of the pipe. A tip of the receiving port is provided with a tapered receiving surface forcedly abutting against the abutting surface, in a state of widening toward a tip thereof, and a radially smaller end portion of the receiving surface on a side of the pipe, whose diameter is smaller than the other end portion thereof, is subjected to the pressing force for pressing it in a pressing direction by the pressing portion of the pushing ring.

Thus, the abutting surface on a side of the pipe forcedly abuts against the receiving surface on a side of the receiving port, thereby forming the primary sealing portion S1 shown in FIG. 8, and the pressing portion of the pushing ring forcedly abuts against the radially smaller end portion of the receiving surface on a side of the pipe.

According to the present invention, a cylindrical overlapping piece overlapped with the receiving surface may be continuously formed on the pressing portion of the pushing ring, by mounting the overlapping piece on the receiving surface on a side of the pipe to increase the diameter in a state of widening a tip thereof.

Thus, a friction resistance is generated between the receiving surface on a side of the pipe material and a cylindrical overlapping piece whose diameter is increased when proceeding to the tip thereof to be overlapped with the receiving surface, thereby preventing the pushing ring from being loosened.

According to the present invention, the stepped surface may be overlapped with an end surface of the inner projection, thereby forming the axial sealing portion.

By adopting this structure, a liquid passing through the axial sealing portion and a pipe path subsequently, does not intrude into a gap between the end surface of the cylindrical portion and the bottom surface of the annular recessed portion, which are axially opposed to each other, a gap between the grooved bottom surface of the annular groove portion and the end surface of the outer projection, which are axially opposed to each other, a gap between the inner peripheral surface of the cylindrical portion and the inside surface of the annular recessed portion, which are radially opposed to each other, a gap between the inside surface of the annular groove portion and the inner peripheral surface of the outer projection which are axially opposed to each other and a gap between the outside surface of the annular groove portion and the outer surface of the outer projection, which are opposed to each other, thereby preventing the liquid from staying on a pipe connecting portion.

In case that the stepped surface is overlapped with an end surface of the inner projection, a shape of the overlapping portion can be variously selected. It is allowed to select any one of the following cases. In case that the above stepped surface and the end surface of the inner protrusion are formed as a flat surface, the overlapping surface is flat. In case that the above stepped surface and the end surface of the inner protrusion are formed in a stepped state, the overlapping surface is stepped. In case that the above stepped surface and the end surface of the inner protrusion are formed in a tapered state, the overlapping surface is tapered. In case that the above stepped surface and the end surface of the inner protrusion are formed in a radially wavelike state, the overlapping portion is wavelike.

According to the present invention, preferably, the cylindrical portion is supported by the inner projection, from a radially inward direction.

In this arrangement, the cylindrical portion on a side of the joint body is supported by the inner projection on a side of the inner ring, from a radially inward direction. Therefore, even if the cylindrical portion is going to be deformed so as to decrease in a direction of decreasing diameter, under the influence of a case wherein the outer projection on a side of the inner ring is forcedly inserted in the annular groove portion on a side of the joint body, a force for causing such a deformation of the cylindrical portion is received by the inner projection on a side of the inner ring, thereby preventing the cylindrical portion from decreasing and being deformed in a direction of decreasing the diameter. As a result, this is useful for restricting a decrease of the sealing property owing to creep.

The pipe joint made of resin according to the present invention mentioned above, means not only a single pipe joint made of resin for connecting the pipe materials to each other, but also a pipe joint made of resin whose joint body is integrally included by an end of the pipe material or a fluid device.

As mentioned above, according to the present invention, the early sealing property can be kept for a long period without severely controlling a torque for fastening the pushing ring, thereby making it possible to provide the pipe joint made of resin wherein neither a high technique nor skill is required in connecting operation.

A number of features of the present invention are shown by embodiments as below.

DETAILED DESCRIPTION OF THE PREFERRED EMBODIMENTS

Referring now to the drawing, preferred embodiments of the present invention are described below.

Figure 1:
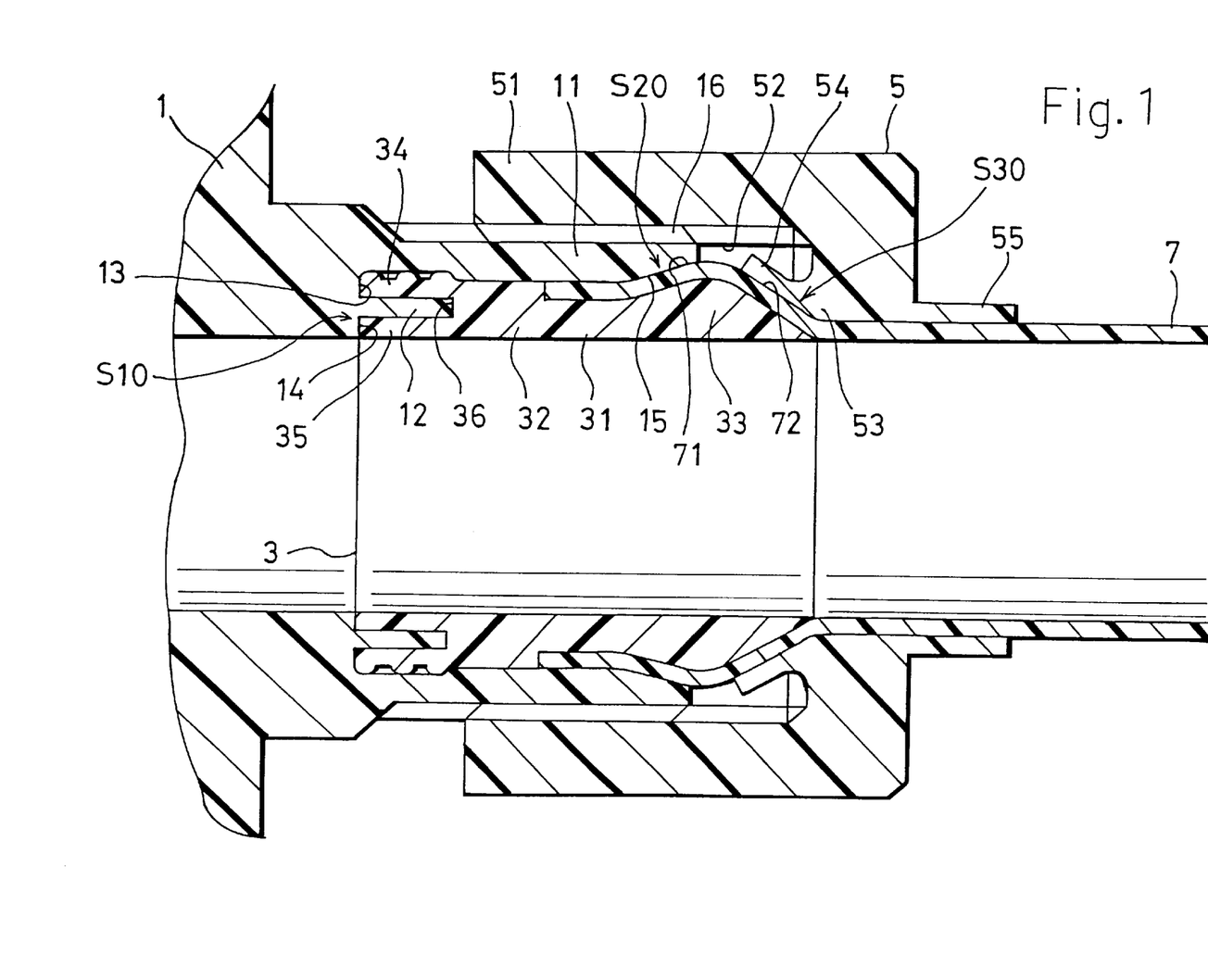
FIG. 1 is a longitudinal sectional side view of an embodiment of a pipe joint made of resin according to the present invention.
Figure 7:
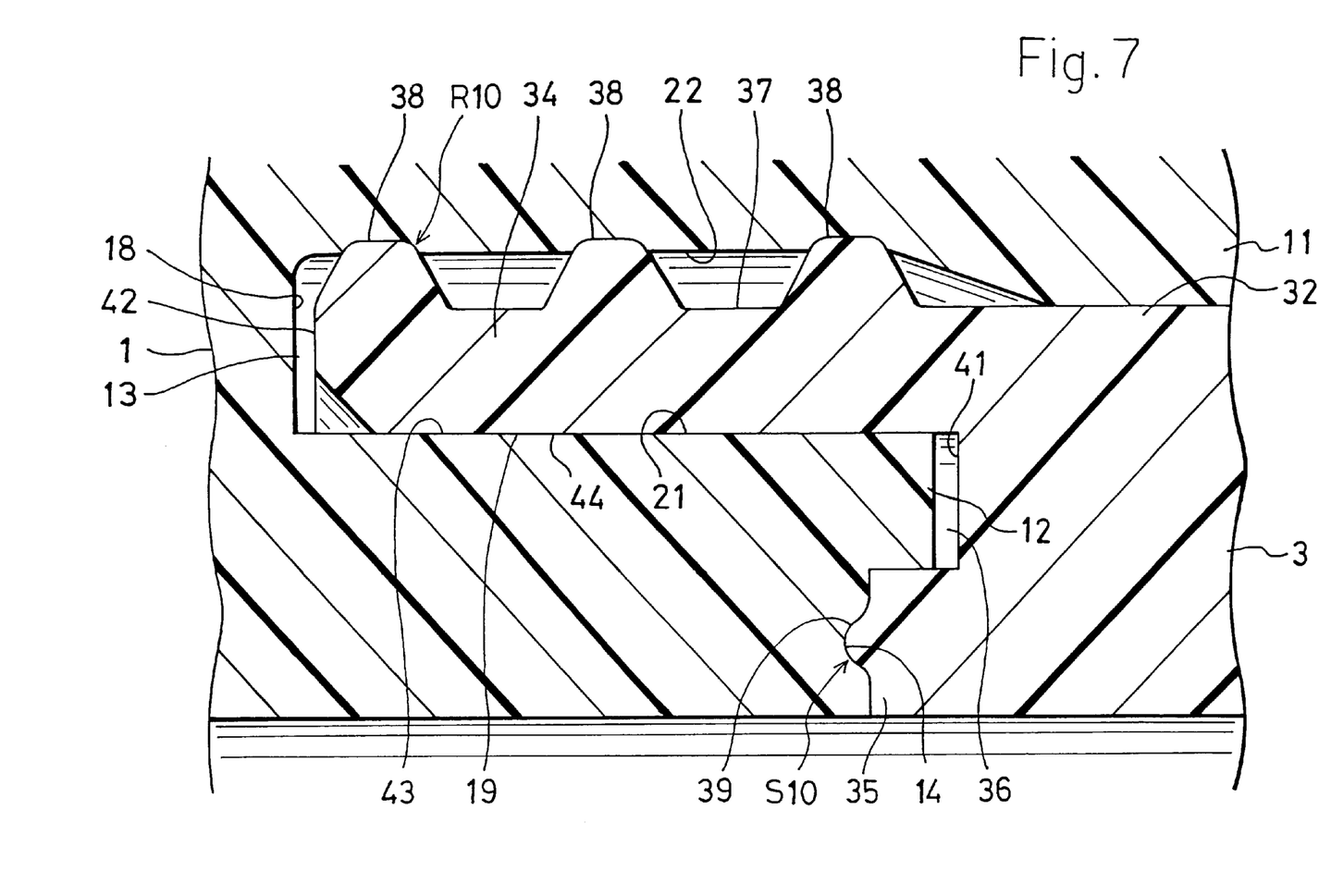
FIG. 7 is a sectional view illustrating still another shape of the overlapping portion of the axial sealing portion.

A pipe joint made of resin as shown in FIGS. 1 and 7 includes a cylindrical joint body 1, a cylindrical inner ring 3, and a cap nut shaped pushing ring 5. The joint body 1, the inner ring 3 and the pushing ring 5 are individually made of a synthetic resin such as PFA (perfluoro-alkoxyfluoro plastics), PTFE (polytetrafluoroetylene), ETFE (etylene-tryfluoro-etylene), CTFE (chloro-tryfluoro-etylene), ECTFE (etylene-chloro-tryfluoro-etylene), having a superior feature in resistance to chemicals and resistance to heat.

The joint body 1 has a cylindrical receiving port 11 on at least one axial end portion thereof. The joint body 1 is provided with a short cylindrical portion 12 protruding in the inside area defined by the receiving port 11, and being concentric with the receiving port 11, forming an annular groove portion 13 disposed between the cylindrical portion 12 and the receiving port 11. An annular stepped surface 14 protrudes from a base of the cylindrical portion 12 in a radial direction. Moreover, on a tip of the receiving port 11, a receiving surface 15 which is tapered so as to widened toward a tip thereof and concentrical with the receiving port 11, is disposed. Furthermore, the receiving port 11 has a male thread portion 16 on an outer peripheral portion thereof.

The inner ring 3 is formed so that an inner diameter thereof may have the same measurements as an inner diameter of a pipe 7 made of synthetic resin and an inner diameter of the joint body 1. Therefore, when the inner ring 3 as shown in FIG. 1 is employed, so as to connect the pipe 7 to the pipe body 1, a fluid (or a liquid) flows smoothly inside each path of the pipe 7, the inner ring 3 and the joint body 1. As shown in FIG. 1, the inner ring 3 includes a connecting portion 31 connected to the pipe 7 by being forcedly inserted in an end of the pipe 7, and a protruding portion 32 projected from the end of the pipe 7 when the connecting portion 31 is connected to the end of the pipe 7. The connecting portion 31 of the inner ring 3 includes a swelling portion 33 whose section is chevron. When the connecting portion 31 is forcedly inserted into an end of the pipe 7, the diameter of the forcedly inserted pipe 7 of the connecting portion 31 is increased, thus forming a tapered abutting surface 71 whose diameter is decreased when proceeding to a tip of the pipe 7 and a tapered receiving surface 72 whose diameter is increased when proceeding to a tip of the pipe 7. By inserting the protruding portion 32 in the receiving port 11, the protruding portion 32 is protrusively provided with an annular outer projection 34 which is inserted in the annular groove portion 13 arranged outside the cylindrical portion 12, and an annular inner projection 35 inserted in an inside of the cylindrical portion 12, in an axial direction. An annular recessed portion 36 is disposed between the outer projection 34 and the inner projection 35. Additionally, as shown clearly in FIGS. 3 and 4, on an outer peripheral surface 37 of the outer projection 34, a number of bulged portions 38 (for example, three bulged portions in the figure) being annular, are axially disposed at intervals. Though a section of the bulged portions 38 illustrated in the figure is trapezoid, it may be arc-shaped. Moreover, the number of the bulged portions may be one or three or more.

Figure 2:
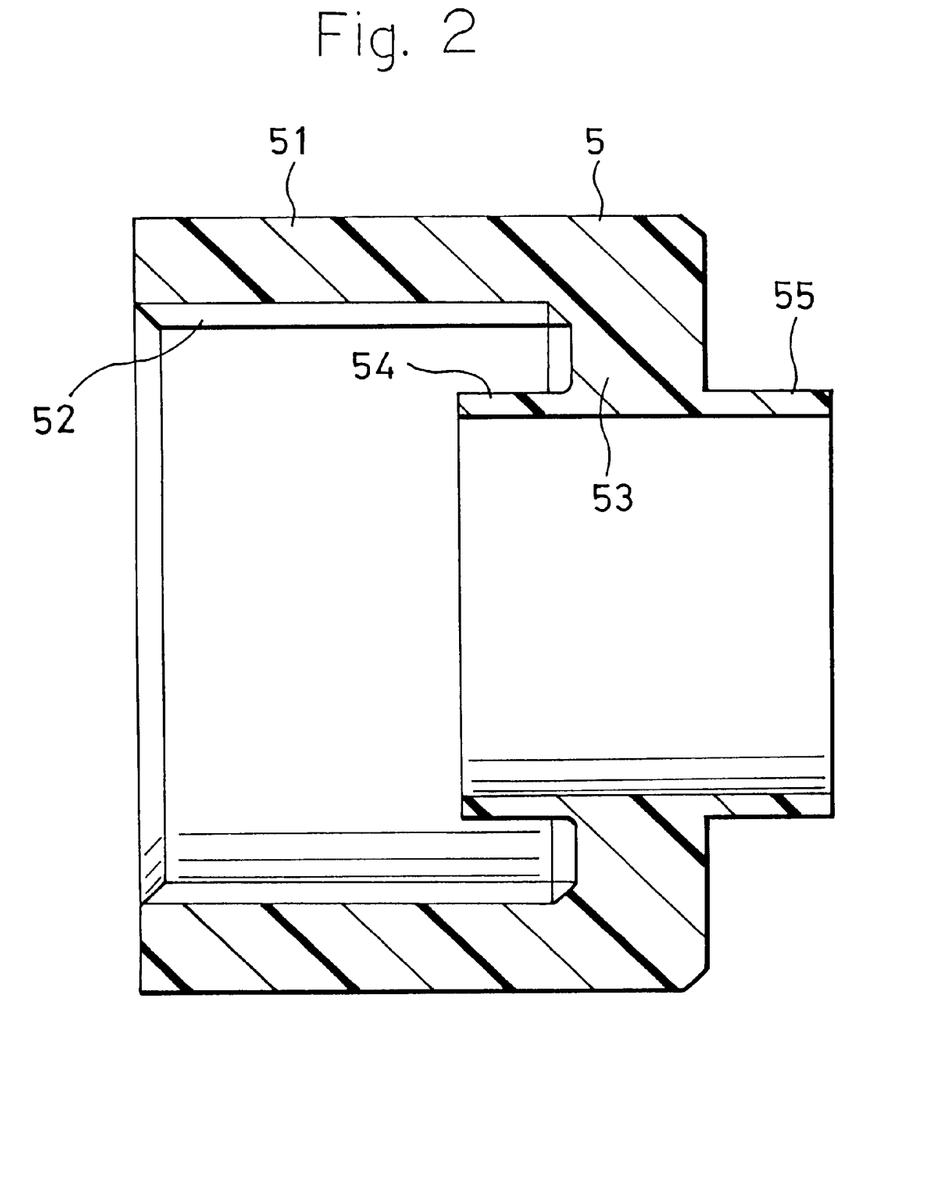
FIG. 2 is a longitudinal sectional side view of a pushing ring.

The pushing ring 5 has a female thread portion 52 on an inner peripheral portion of an outer ring portion 51. Additionally, an annular pressing portion 53 protruding in a radially inward direction is continuously formed on an outer end portion of the outer ring portion 51, a cylindrical overlapping piece 54 and a cylindrical protruding piece 55 are respectively continuously formed on an axially inward side and an axially outward side of an inner peripheral side of the pressing portion 53. The inner diameter of the pressing portion 53 has measurements which enable the pressing portion 53 to be fitted in the pipe 7, and is equal to that of the end on a radially smaller side of the receiving surface 72 on a side of the pipe 7. Furthermore, the diameter of the cylindrical overlapping piece 54 can be increased owing to a feature of the resin.

According to the above pipe joint made of resin, as shown in FIG. 1, the connecting portion 31 is forcedly inserted into an end portion of the pipe 7 thereby inserting the protruding portion 32 of the inner ring 3 connected to the pipe 7 into the receiving port 11 of the joint body 1, whereby the female thread portion 52 of the pushing ring 5 previously inserted in the pipe 7 is threadedly connected to the male thread portion 16 of the receiving port 1 of the joint body 1 by means of a screw connection for fastening with the result that the pressing portion 53 of the pushing ring 5 presses the end on the radially smaller side of the receiving surface 72 formed on a side of the pipe 7. Therefore, the inner ring 3 is subjected to the pressing force in a pressing direction. Furthermore, the pushing ring 5 is fastened, whereby the cylindrical overlapping piece 54 of the pushing ring 5 is mounted on the receiving surface 72 on a side of the pipe 7. The diameter of the overlapping piece 54 is increased in a state of widening toward a tip thereof whereby the overlapping piece 54 is overlapped with the receiving surface 72. Then, a friction resistance is caused between the overlapping piece 54 and the receiving surface 72, thereby preventing the pushing ring 5 from loosening.

When the inner ring 3 is pressed in a pressing direction, a cylindrical portion 12 on a side of the joint body 1 is inserted into the annular recessed portion 36 on a side of the inner ring 3, and the inner projection 35 and the outer projection 34 on a side of the inner ring 3 are respectively inserted in the annular groove portion 13 outside the cylindrical portion 12 and an inside of the cylindrical portion 12. Therefore, as shown in FIGS. 3, and 5 to 7, the stepped surface 14 is axially opposed to an end surface 39 of the inner projection 35, an end surface 17 of the cylindrical portion 12 is axially opposed to a bottom surface 41 of the annular recessed portion 36, and a grooved bottom surface 18 of the annular groove portion 13 is axially opposed to an end surface 42 of the outer projection 34. Additionally, an inner peripheral surface 19 of the cylindrical portion 12 is radially opposed to an inside surface 43 of the annular recessed portion 36, an inside surface 21 of the annular groove portion 13 is radially opposed to an inner peripheral surface 44 of the outer projection 34, and an outside surface 22 of the annular groove portion 13 is radially opposed to the outer peripheral surface 37 of the outer projection 34 (in particular, the bulged portions 38 of the outer peripheral surface 37).

Figure 3:
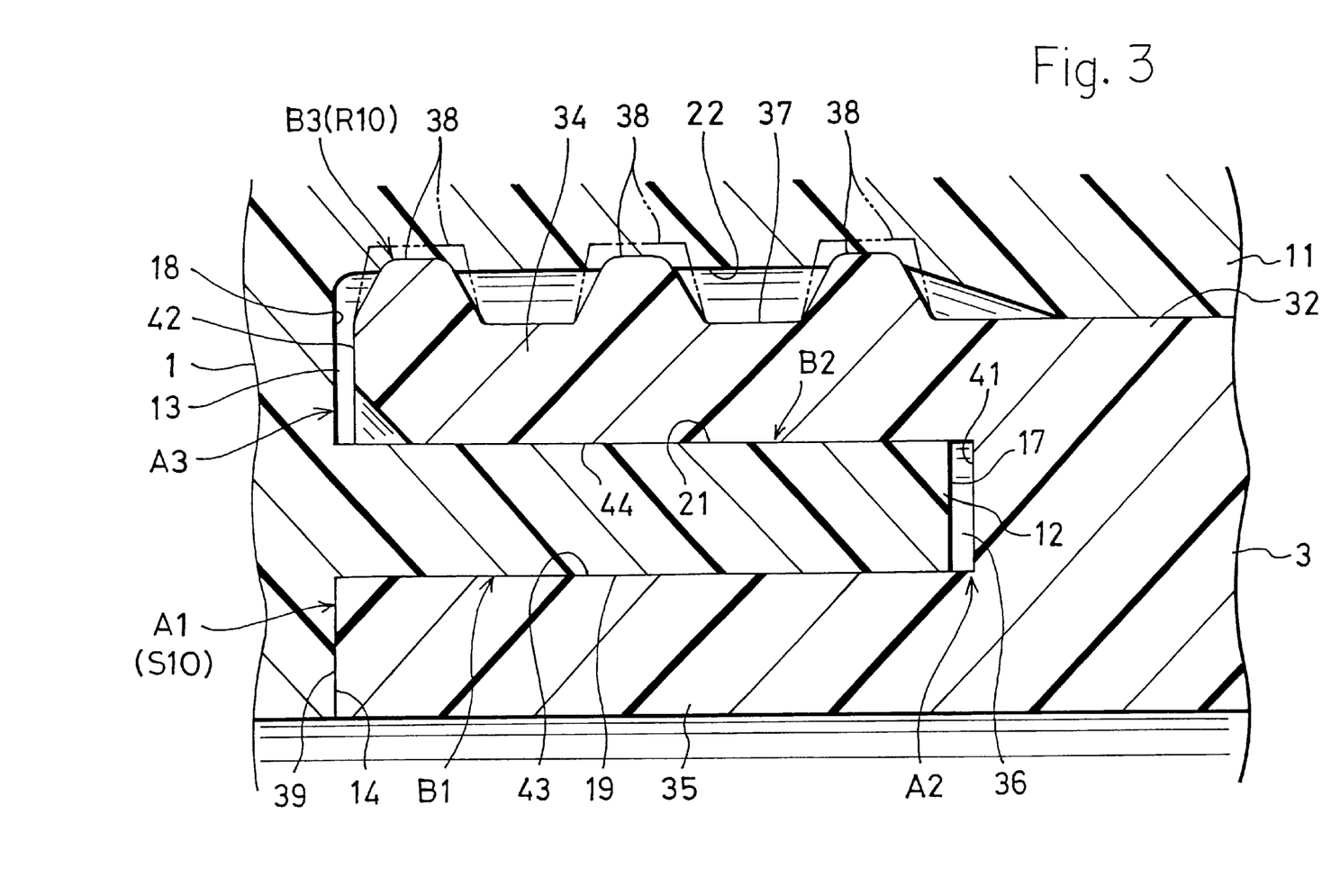
FIG. 3 is an enlarged sectional view of enlarging a main portion of FIG. 1.
Figure 4:
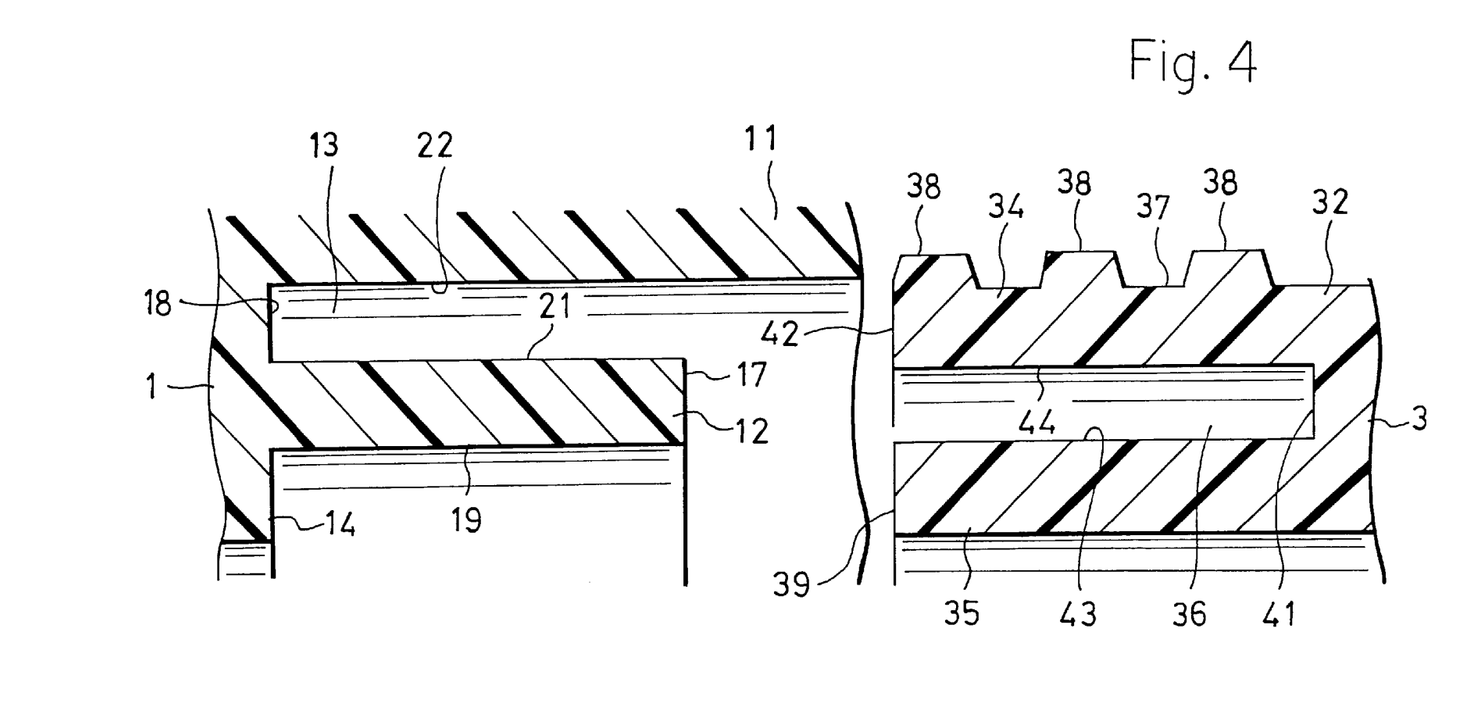
FIG. 4 is an enlarged sectional view of enlarging each main portion of a joint body and an inner ring.

Herein, as shown in FIG. 3, an axially opposed portion where the stepped surface 14 is axially opposed to the inner projection 39 is designated as A1, an axially opposed portion where an end surface 17 of the cylindrical portion is axially opposed to the bottom surface 41 of the annular recessed portion is designated as A2, and an axially opposed portion where the grooved bottom surface 18 of the annular groove portion is axially opposed to the end surface 42 of the outer projection is designated as A3. In addition, a radially opposed portion where the inner peripheral surface 19 of the cylindrical portion is radially opposed to the inside surface 43 of the annular recessed portion is designated as B1, a radially opposed portion where the inside surface 21 of the annular groove portion is radially opposed to the inner peripheral surface 44 of the outer projection is designated as B2, a radially opposed portion where the outside surface 22 of the annular groove portion is radially opposed to the outer peripheral surface 37 of the outer projection is designated as B3. On at least one portion among axially opposed portions A1 to A3, the opposed surfaces are overlapped with each other so as to form an axial sealing portion, and on at least one portion among radially opposed portions B1 to B3, the opposed surfaces are overlapped with each other so as to form a radial sealing portion.

In FIG. 3, the axially opposed portion A1 forms an axial sealing portion S10, and the radially opposed portion B3 forms a radial sealing portion R10. As a means for forming the axial sealing portion S10 on the axially opposed portion A1, the measurements of each surface of the members may be determined so that, when the end surface 39 of the inner projection abuts against the stepped surface 14 by means of pressure, the end surface 17 of the cylindrical portion may be separated from the bottom surface 41 of the annular recessed portion, and the grooved bottom surface 18 of the annular groove portion may be separated from the end surface 42 of the outer projection. Moreover, as a means for forming the radial sealing portion R10 on the radially opposed portion B3, as shown in an assumption line in FIG. 3, an outer diameter of each bulged portion 38 of the outer peripheral surface 37 of the outer projection is slightly larger than a diameter of the outside surface 22 of the annular groove portion, thus forcedly inserting the outer projection 34 in the annular groove portion 13 to make the outer peripheral surface 37 of the outer projection forcedly abut against the outside surface 22 of the annular groove portion.

As mentioned above, the axially opposed portion A1 is provided with the axial sealing portion S10, and the radially opposed portion B3 is provided with the radial sealing portion R10, whereby a sealing surface pressure occurring in these sealing portions S10 and R10 maintains a sealing property. In this case, the sealing surface pressure occurring in the radial sealing portion R10 is generated regardless of a fastening amount or a fastening torque of the pushing ring 5, thereby obtaining the stable sealing surface pressure. Consequently, it is not required to strictly control the fastening torque of the pushing ring 5. Moreover, in this embodiment, the pressing portion 53 of the pushing ring 5 presses the inner ring 3 in a pressing direction, the abutting surface 71 on a side of the pipe 7 forcedly abuts against the receiving surface 15 of the joint body 1, thereby forming an axial sealing portion S20, and the pressing portion 53 of the pushing ring 5 forcedly abuts against the receiving surface 72 on a side of the pipe 7, thereby forming an axial sealing portion S30 (see FIG. 1). Therefore, there are three axial sealing portions S10, S20 and S30. Consequently, even if the sealing property in the axial sealing portion of any portion among them is decreased, the other axial sealing portions exhibit the necessary sealing property. Especially, in this embodiment, on the axially opposed portion A1 where the stepped surface 14 is axially opposed to the end surface 39 of the inner projection, the axial sealing portion S10 is formed, thereby preventing a fluid flowing in the pipe path from entering B1, A2, B2, A3, B3, with the result that the fluid is not retained in the each pipe connecting portion.

Figure 5:
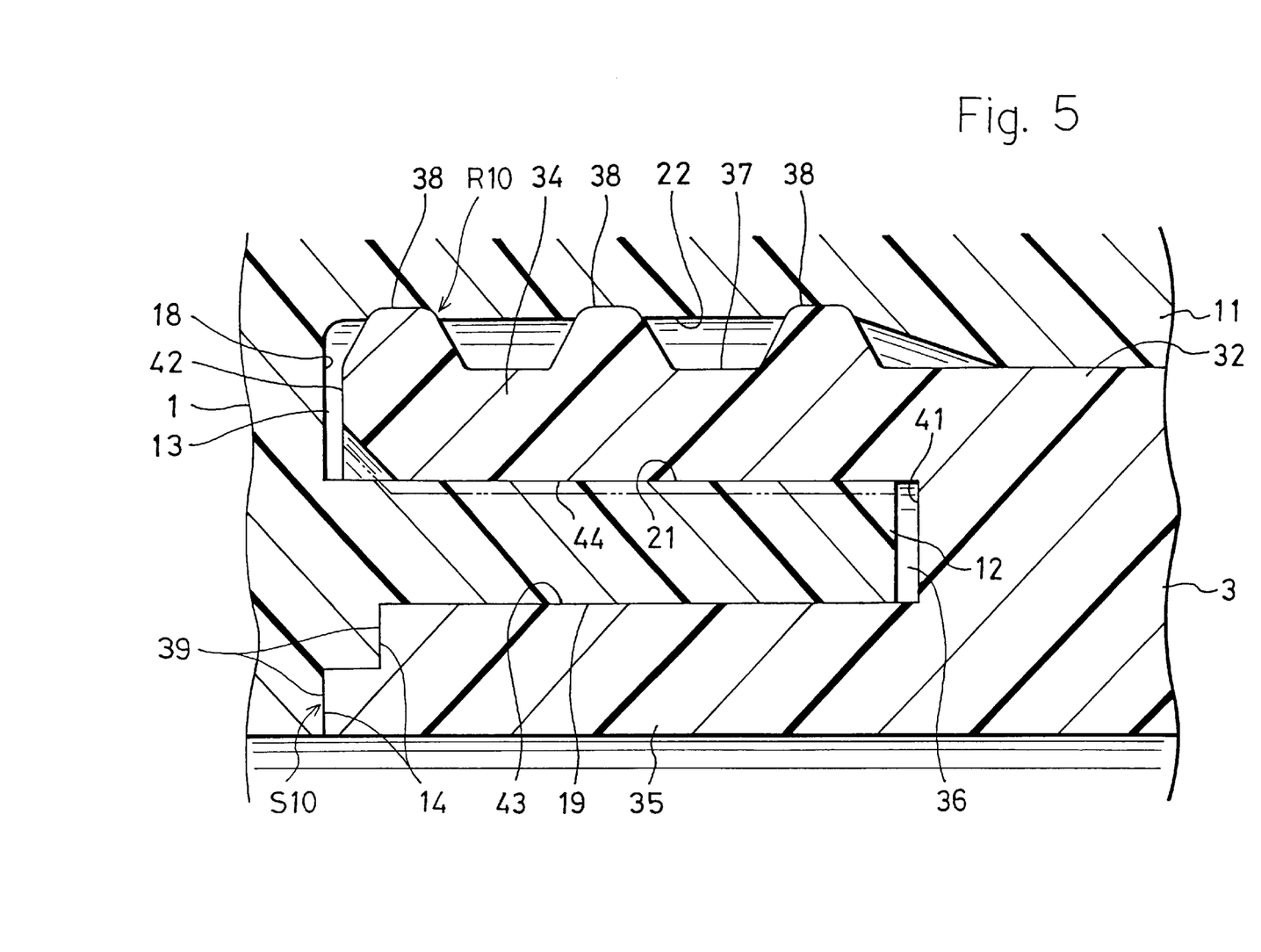
FIG. 5 is a sectional view illustrating a shape of an overlapping portion of an axial sealing portion.
Figure 6:
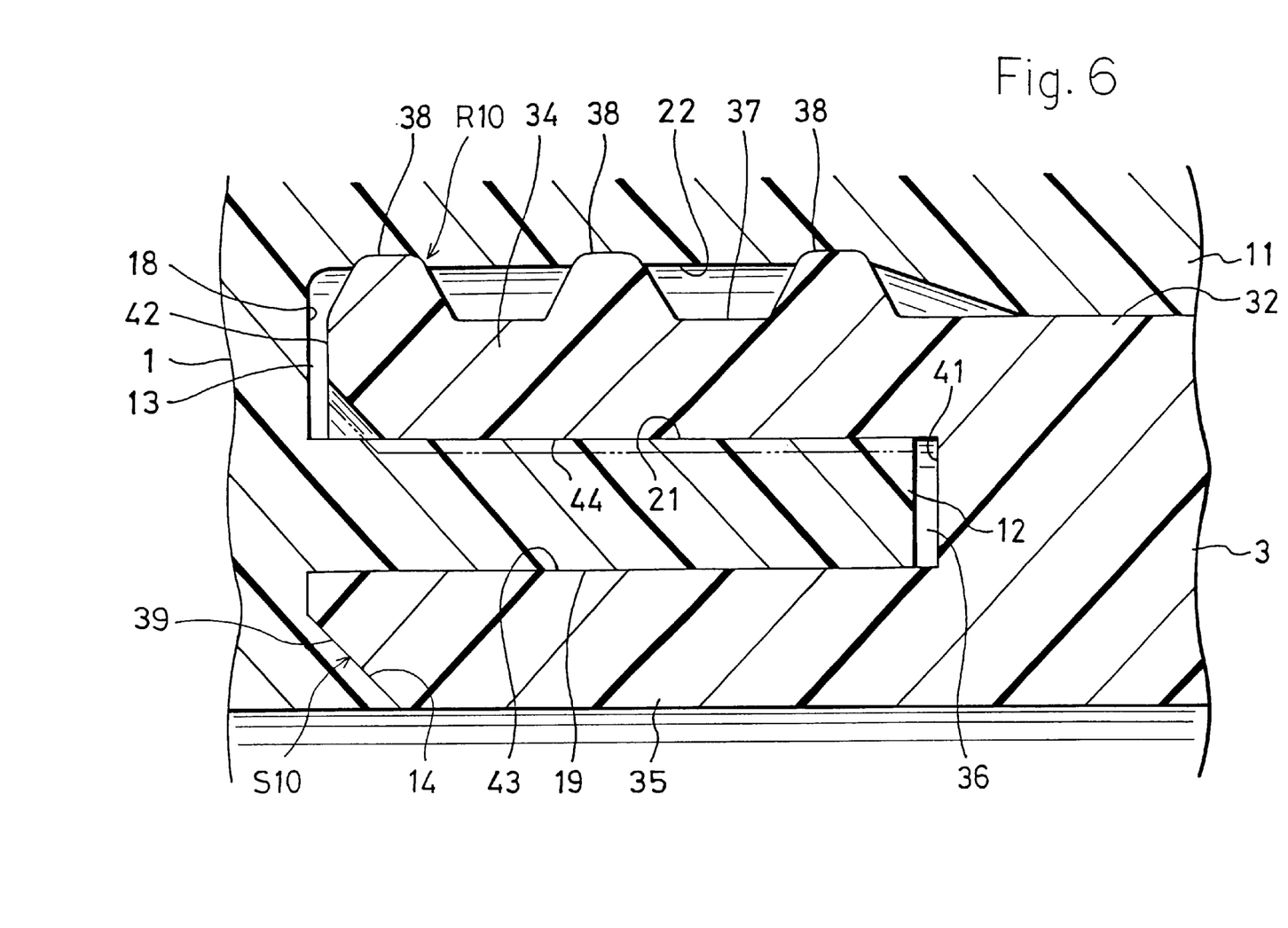
FIG. 6 is a sectional view illustrating another shape of the overlapping portion of the axial sealing portion.

As mentioned above, in case that, on the axially opposed portion A1, the axial sealing portion S10 is formed, a shape of the portion where the stepped surface 14 is overlapped with the end surface 39 of the inner projection, may be flat as shown in FIG. 3, stepped as shown in FIG. 5, taper as shown in FIG. 6 wherein the diameter is subsequently reduced from a direction of an inner diameter to an axial direction, or radially wavelike as shown in FIG. 7, made of a combination of an axial convex portion and an axial concave portion.

According to the present embodiment, the cylindrical portion 12 on a side of the joint body 1 is reinforcedly supported by the inner projection 35 on a side of the inner ring 3 and the stepped surface 14 of the receiving port 11, from a radially inward direction. As a result, even if the cylindrical portion 12 is going to be deformed so as to decrease in a direction of decreasing diameter, under an influence of a case wherein the outer projection 34 on a side of the inner ring 3 is forcedly inserted in the annular groove portion 13 on a side of the joint body 1, a force for causing the deformation of the cylindrical portion 12 is received by the inner projection 35 on a side of the inner ring 3, thereby preventing the cylindrical portion 12 from decreasing and being deformed in a direction of decreasing the diameter. As a result, this is useful for restricting a decrease of the sealing property due to creep.

In this embodiment, among three axially opposed portions A1, A2 and A3, the axial sealing portion S10 is formed on the axially opposed portion A1. However, the axial sealing portion may be formed on at least one portion selected among the three axially opposed portions A1, A2, and A3. Similarly, in this embodiment, the radial sealing portion R10 is formed on one radially opposed portion B3 among three radially opposed portions B1, B2 and B3. However, the radial sealing portion may be formed on at least one portion selected among the three radially opposed portions B1, B2, and B3. In addition, either the axial sealing portion or the radial sealing portion may be formed.

Furthermore, the radial sealing portion R10 may be formed by making the outer peripheral surface of the outer projection 34 having the straight outer peripheral surface forcedly abut against the outside surface of the annular groove portion.

What is claimed is:

1. A pipe joint made of resin, including a joint body defining an inside area, an inner ring, and a pushing ring, an end portion of a pipe being adapted for insertion in said inside area of said joint body, the end portion of the pipe being pressed by said pushing ring against said joint body in said inside area of said joint body, thereby connecting the pipe to said joint body, wherein:

said joint body has a cylindrical receiving port disposed on an end portion thereof;

said joint body further has a cylindrical portion protruding from an end portion thereof and inside of the said cylindrical receiving port concentrically therewith, said cylindrical receiving port and said cylindrical portion defining an annular groove between them;

said inner ring is sleeve-shaped and has a connecting portion and a protruding portion, said inner ring being insertable in the said receiving port, such that said connecting portion is forcedly inserted in the end portion of the pipe so as to be connected to the pipe, said protruding portion protruding from the end portion of the pipe and in said receiving port when said connecting portion is connected to the end of the pipe;

said protruding portion has an annular outer projection and an annular inner projection both axially protruding therefrom, said annular outer projection being inserted in said annular groove on the outside of said cylindrical portion by inserting said protruding portion of said inner ring in said receiving port, said annular inner projection being inserted on the inside of said cylindrical portion by inserting said protruding portion of said inner ring in said receiving port, said annular outer projection and said annular inner projection defining an annular recessed portion disposed between said annular outer projection and said annular inner projection; and said pushing ring has a pressing portion disposed thereon and is threadedly connected to said cylindrical receiving port, said pushing ring applying a pressing force with said pressing portion for pressing against said inner ring when said inner ring is connected to the end portion of the pipe and said cylindrical protruding portion is inserted in said receiving port, and when said pushing ring is threadedly connected to said receiving port.

2. A pipe joint made of resin according to claim 1, further wherein: said joint body further has an annular stepped surface which protrudes from a base of said cylindrical portion in an inwardly radial direction; said cylindrical portion has an end surface; said annular inner projection has an end surface; said annular recessed portion has a bottom surface; and said annular groove has a grooved bottom surface such that when said pressing force is applied to said inner ring by the pressing portion of said pushing ring, (i) said annular stepped surface is axially opposed to said end surface of said annular inner projection, (ii) said end surface of said cylindrical portion is axially opposed to said bottom surface of said annular recessed portion, and (iii) said grooved bottom surface of said annular groove is axially opposed to said end surface of said annular outer projection, with the result that three axially opposed portions are disposed, and the opposed surfaces are overlapped with each other on at least a portion among the axially opposed portions thereby forming an axial sealing portion.

3. A pipe joint made of resin according to claim 2, wherein the stepped surface is overlapped with an end surface of the inner projection, thereby forming the axial sealing portion with the result that the stepped surface and the end surface of the inner projection are formed as a flat surface.

4. A pipe joint made of resin according to claim 2, wherein the stepped surface is overlapped with an end surface of the inner projection, thereby forming the axial sealing portion with the result that the stepped surface and the end surface of the inner projection are formed in a stepped state.

5. A pipe joint made of resin according to claim 2, wherein the stepped surface is overlapped with an end surface of the inner projection, thereby forming the axial sealing portion with the result that the stepped surface and the end surface of the inner projection are formed in a tapered state.

6. A pipe joint made of resin according to claim 2, wherein the stepped surface is overlapped with an end surface of the inner projection, thereby forming the axial sealing portion with the result that the stepped surface and the end surface of the inner projection are formed in a radially wavelike state.

7. A pipe joint made of resin according to claim 2, wherein the cylindrical portion is supported by the inner projection, from a radially inward direction.

8. A pipe joint made of resin according to claim 1, further wherein: said cylindrical portion has an inner peripheral surface; said annular recessed portion has an inside surface;

said annular groove portion has an inside surface and an outside surface; and said annular outer projection has an inner peripheral surface and an outer surface, such that when said pressing force is applied to said inner ring by the pressing portion of said pushing ring, (i) said inner peripheral surface of said cylindrical portion is radially opposed to said inside surface of said annular recessed portion, (ii) said inside surface of said annular groove portion is radially opposed to said inner peripheral surface of said annular outer projection, and (iii) said outside surface of said annular groove portion is radially opposed to said outer surface of said annular outer projection, with the result that three radially opposed portions are disposed, and the opposed surfaces are overlapped with each other on at least a portion among the radially opposed portions, thereby forming a radial sealing portion.

9. A pipe joint made of resin according to claim 8, wherein the cylindrical portion is supported by the inner projection, from a radially inward direction.

10. A pipe joint made of resin according to claim 8, further wherein: said connecting portion includes a bulged portion annularly disposed on an outer surface thereof; and the outside surface of said annular groove portion is overlapped with said bulged portion to form the radial sealing portion.

11. A pipe joint made of resin according to claim 10, further wherein: a plurality of bulged portions are axially arranged in line on the outer surface of said connecting portion.

12. A pipe joint made of resin according to claim 1, further wherein: said joint body further has an annular stepped surface which protrudes from a base of said cylindrical portion in an inwardly radial direction; said cylindrical portion has an inner peripheral surface and an end surface; said annular inner projection has an end surface; said annular outer projection has an inner peripheral surface and an outer surface; said annular recessed portion has a bottom surface and an inside surface; said annular groove has a grooved bottom surface; and said annular groove portion has an inside surface and an outside surface, such that when said pressing force is applied to said inner ring by the pressing portion of said pushing ring, (i) said an annular stepped surface is axially opposed to said end surface of said annular inner projection, (ii) said end surface of said cylindrical portion is axially opposed to said bottom surface of said annular recessed portion, and (iii) said grooved bottom surface of said annular groove portion is axially opposed to said end surface of said annular outer projection, with the result that three axially opposed portions are disposed, and the opposed surfaces are overlapped with each other on at least a portion among the axially opposed portions thereby forming an axial sealing portion, and (i') said inner peripheral surface of said cylindrical portion is radially opposed to said inside surface of said annular recessed portion, (ii') said inside surface of said annular groove portion is radially opposed to said inner peripheral surface of said annular outer projection, and (iii') said outside surface of said annular groove portion is radially opposed to said outer surface of said annular outer projection, with the result that three radially opposed portions are disposed, and the opposed surfaces are overlapped with each other on at least a portion among the radially opposed portions, thereby forming a radial sealing portion.

13. A pipe joint made of resin according to claim 12, wherein the cylindrical portion is supported by the inner projection, from a radially inward direction.

14. A pipe joint made of resin according to claim 1, further wherein: said pushing ring has a pressing portion; a diameter of the pipe material in which said connecting portion is forcedly inserted, is increased by said connecting portion; as a result of which the outer surface of the pipe material is provided with a swelling portion in the shape of a chevron, including a tapered abutting surface whose diameter decreases as it proceeds to a tip of the pipe material, and a tapered receiving surface whose diameter increase as it proceeds to a tip of the pipe material; a tip of said cylindrical receiving port is provided with a tapered receiving surface forcedly abutting against said tapered abutting surface, toward a tip of said cylindrical receiving port; and a radially smaller end portion of said tapered receiving surface on a side of the pipe material, whose diameter is smaller than the other end portion thereof, is subjected to said pressing force pressing it in a pressing direction by said pressing portion of said pushing ring.

15. A pipe joint made of resin according to claim 14, wherein a cylindrical overlapping piece overlapped with the receiving surface is continuously formed on the pressing portion of the pushing ring, by mounting the overlapping piece on the receiving surface on a side of the pipe material to increase the diameter in a state of widening a tip thereof.

16. A pipe joint made of resin according to claim 1, wherein the cylindrical portion is supported by the inner projection, from a radially inward direction.

17. A pipe joint made of resin according to claim 1, wherein the inner ring and the pushing ring are individually made of an optional synthetic resin selected among PFA, PTFE, ETFE, CTFE, and ECTFE.

* * * * *

UNITED STATES PATENT AND TRADEMARK OFFICE
CERTIFICATE OF CORRECTION

PATENT NO. : 6,089,621
DATED : July 18, 2000
INVENTOR(S) : Kiyoshi Nishio

Page 1 of 1

It is certified that error appears in the above-identified patent and that said Letters Patent is hereby corrected as shown below:

Column 9, claim 1,
Line 56, "the" should be deleted;
Line 62, "the" should be deleted;

Column 12, claim 14,
Line 25, "increase" should be -- increases --.

Signed and Sealed this

Twenty-first Day of August, 2001

Attest:

*Nicholas P. Godici*

NICHOLAS P. GODICI
*Attesting Officer*     *Acting Director of the United States Patent and Trademark Office*